(No Model.)

J. L. TOBIN.
ELECTRIC BATTERY.

No. 291,241.  Patented Jan. 1, 1884.

Witnesses  Inventor

UNITED STATES PATENT OFFICE.

JAMES L. TOBIN, OF NEWARK, NEW JERSEY.

ELECTRIC BATTERY.

SPECIFICATION forming part of Letters Patent No. 291,241, dated January 1, 1884.

Application filed March 8, 1883. (No model.)

*To all whom it may concern:*

Be it known that I, JAMES L. TOBIN, of the city of Newark, in the county of Essex and State of New Jersey, have invented a new and useful Improvement in Electric Batteries, of which the following is a specification.

My invention relates to batteries in which one of the elements or plates of the battery is capable of being raised or lowered to vary the depth to which it is immersed in the battery liquid, or to remove it therefrom entirely, and so regulate the current or stop the generation of a current altogether.

The object of my invention is to provide for more quickly and easily shifting the adjustable plate or element, and to provide means whereby the said plate or element will be held or locked automatically the instant that the hand is removed from the device whereby it is raised.

The invention consists in the combination, with a battery plate or element, of an upwardly-extending resilient arm, and an abutment through which said arm moves, and with which it engages with sufficient friction to hold the plate or element in the position to which it is adjusted. The said arm may be provided with a shoulder or offset, which, when the plate or element is raised out of the liquid, will engage with the top of the abutment, and so hold the plate or element positively; or said arm may have other offsets or shoulders at different points in its height.

My invention also consists in the combination, with a battery plate or element, of two upwardly-extending resilient arms connected with said plate or element and diverging upwardly therefrom, and an abutment through which the said arms may move, and with which they engage with sufficient friction to hold the plate or element in the position to which it may be adjusted. Both these diverging arms may be provided with shoulders or offsets, as above described.

Figure 1:
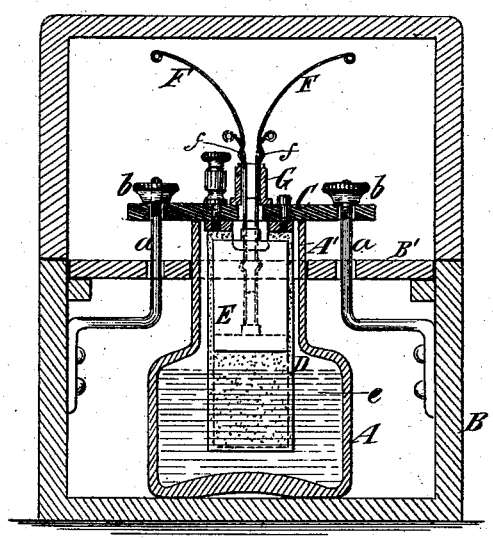
Figure 2:
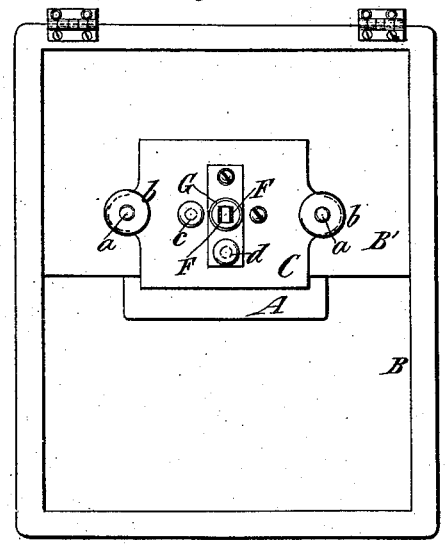

In the accompanying drawings, Figure 1 is a vertical section of a battery embodying my invention and a box containing it, and Fig. 2 is a plan thereof.

Similar letters of reference designate corresponding parts in both figures.

The battery here chosen to illustrate my invention is designed for medical use, and my invention is particularly adapted for such use.

A designates the battery-jar, here shown as arranged in a box, B, and the neck A' of the jar projects through a hole in the top B' of the box, and is thereby held in place laterally.

C designates a cover, which is or may be made of non-conducting material, and which is secured over the mouth of the battery-jar A by rods $a$, projecting upward from the box, and provided with nuts $b$.

D designates plates which form one element of the battery, and of which two are here intended to be used; and E designates the plate which forms the other element of the battery, and of which one or more may be used. The plates D may be of carbon, and the plate E of zinc; and $c$ $d$ designate binding-posts, the first of which is connected with the plates D and the second with the plate E. By raising or lowering the plate E the current may be varied, and by raising it entirely out of the battery-liquid $e$ the generation of a current will be stopped.

F designates two resilient arms or springs, which are connected with the plate E and extend upward therefrom through an abutment, G, which may be made in the form of a tube or post having a square or rectangular hole through it. The arms F have a constant tendency to spring away from each other and diverge, and hence they bear with greater or less force against the opposite sides of the abutment, and their friction on the sides of the abutment is sufficient to hold them and the plate E in any position to which they may be adjusted.

In the arms F there are formed shoulders or offsets $f$, which are above the abutment G when the plate E is out of the liquid, and which engage with the top of the abutment and positively lock and hold the plate in position. If desired, the arms might be provided with several such offsets or shoulders at different points in their length. When it is desired to adjust the plate or element E, the upper ends of the arms F are grasped in the fingers and drawn together, so that they will slide freely in the abutment G. When the plate is immersed to the desired depth, the arms are released and spring away from each other, and press against opposite sides of the abutment with sufficient friction to prevent slipping. Hence the plate or element is locked in position automatically when the arms are released. In Fig. 1 I have shown in full lines the position of the plate and resilient arms when the plate is out of the liquid, and in dotted lines the position of the plate and arms when the plate is fully immersed. The binding-post $d$ is fixed upon a plate, which also carries the abutment, and circuit is closed through the contact of the arms F with the abutment G. Although I have shown two resilient arms, I may use only one, and in the latter case the resilient arm may be used in connection with a rigid arm. As the resilient arms are flat and bear against the flat sides of the abutment, they hold the plate E from turning so as to make contact with the plates D.

It is old to attach one of the plates of a battery to a sliding rod or arm, which may be moved vertically to remove the plate from the liquid or to regulate the depth to which it is immersed; and I am aware that various means have been employed to hold the rod or arm in different positions. I do not therefore claim, broadly, means for holding the aforesaid rod or arm in different positions to which it may be adjusted.

What I claim as my invention, and desire to secure by Letters Patent, is—

1. The combination, with a battery plate or element, of an upwardly-extending resilient arm, and an abutment through which said arm moves, and with which it engages with sufficient friction to hold the plate or element in the position to which it is adjusted, substantially as specified.

2. The combination, with a battery plate or element, of an upwardly-projecting resilient arm provided with a shoulder or offset, and an abutment through which said arm may move, and with which the shoulder or offset of the arm may engage to hold the plate or element in position, substantially as described.

3. The combination, with a battery plate or element, of two resilient arms connected with said plate or element and diverging upwardly therefrom, and an abutment through which said arms may move, and with which they engage to hold the plate or element in position, substantially as specified.

4. The combination of the plate E, the resilient and diverging arms F, provided with offsets or shoulders $f$, and the abutment G, substantially as described.

JAMES L. TOBIN.

Witnesses:
FREDK. HAYNES,
CHANDLER HALL.